(No Model.)

S. E. LICKLIDER.
Stock Feeder.

No. 231,823. Patented Aug. 31, 1880.

WITNESSES:
W. W. Hollingsworth
Solon C. Kernon

INVENTOR:
S. E. Licklider
BY
ATTORNEYS.

UNITED STATES PATENT OFFICE.

SAMUEL E. LICKLIDER, OF EVERETT, MISSOURI.

STOCK-FEEDER.

SPECIFICATION forming part of Letters Patent No. 231,823, dated August 31, 1880.

Application filed March 16, 1880. (No model.)

*To all whom it may concern:*

Be it known that I, SAMUEL E. LICKLIDER, of Everett, in the county of Cass and State of Missouri, have invented a new and Improved Stock-Feeder; and I do hereby declare that the following is a full, clear, and exact description of the same.

My invention is an improvement in the class of live-stock feeders consisting of combined hay-racks and mangers. The feature of novelty is the construction of the rack or hay-receptacle and its arrangement relative to the manger, whereby certain advantages are obtained, as hereinafter set forth.

Figure 1:
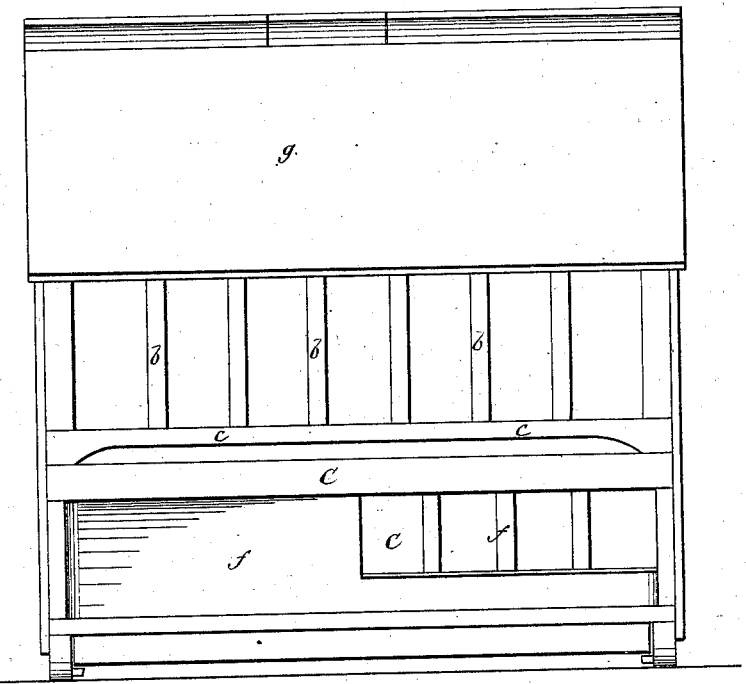
Figure 2:
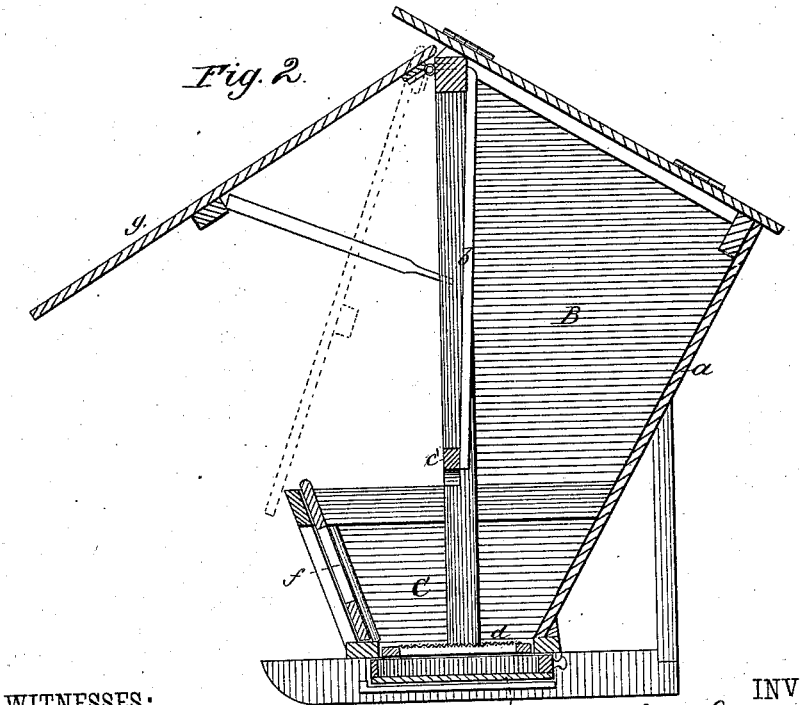

In accompanying drawings, forming part of this specification, Figure 1 is a front view, and Fig. 2 a vertical section, of my improved stock-feeder.

I show my improvements in connection with and forming part of a portable shed.

The hay-receptacle or feeder B has an inclined back, $a$, and a vertical front, $b$, which latter consists of a series of parallel bars forming a rack. The back $a$ is extended downward, and forms the back of the manger C, which is placed directly beneath the rack $b$, so that half of the manger is in front of the plane of the latter. The rack-bars $b$ are not, however, continued down to the top of the manger C, but terminate a considerable distance above it, being attached to a bar, $c'$, as shown, so that a space is left between them which is of sufficient width to allow stock to insert their heads beneath the rack for the purpose of drawing out the hay, which tends to crowd down into the manger as fast as consumed, and is thus exposed in the manger, so as to be easily accessible. It will occasionally happen, however, that the feeder B will become packed and gorged, so that the hay will not move downward of itself, and in such case the stock cannot, of course, obtain any by reaching under the rack $b$. They will therefore begin to draw out hay between the rack-bars $b$, which will have the effect of speedily relieving the pressure on the hay in the feeder B by reducing its quantity, and thereby allowing it to feed downward, as before, so as to become accessible below the rack, where the stock can more easily obtain it.

By the above-described construction the stock are enabled to feed without the difficulty and annoyance to them which would be incident to pulling each mouthful from the rack, and yet are enabled to quickly relieve a gorge in the feeder, so as to allow descent of a fresh quantity of hay into the manger.

The distinguishing feature of my invention is, therefore, the separation of the lower part of the rack from the inclined imperforate back $a$, and its relation to the trough, so that a chute is formed for descent of hay (between the rack and said back $a$) into the trough. I do not, however, claim the arrangement of a rack, either in an inclined or vertical position, above a trough.

The bottom of the manger C is formed of a wire screen, $d$, and beneath it is placed a drawer, $e$, to receive and save the seed which passes through it.

The front of the manger consists of a board, $f$, having openings in one portion, which enable small stock, such as sheep, to have convenient access to the feed.

The front $f$ may be raised, when required, for the purpose of removing the refuse or unconsumed portion of the feed from the trough C.

The front portion, $g$, of the roof of the stock-feeder is hinged so that it may be lowered, as shown in dotted lines, Fig. 2, to prevent access of the stock to the manger C or to exclude snow and rain.

What I claim is—

A live-stock feeder having the trough C and the inclined imperforate back $a$, which extends down to said trough, and the rack $b$, whose lower edge is separated from said back and trough, as shown and described, to allow the descent of hay and access of the stock thereto, in the manner specified.

SAMUEL EDEN LICKLIDER.

Witnesses:
W. W. WILLIAMS,
E. I. ARNOLD.